Jan. 23, 1968 E. FOLKMANN ET AL 3,365,336

METHOD AND APPARATUS OF EPITAXIALLY DEPOSITING SEMICONDUCTOR MATERIAL

Filed Sept. 13, 1965 2 Sheets-Sheet 1

Jan. 23, 1968 E. FOLKMANN ET AL 3,365,336

METHOD AND APPARATUS OF EPITAXIALLY DEPOSITING SEMICONDUCTOR MATERIAL

Filed Sept. 13, 1965 2 Sheets-Sheet 2

United States Patent Office 3,365,336
Patented Jan. 23, 1968

3,365,336

METHOD AND APPARATUS OF EPITAXIALLY DEPOSITING SEMICONDUCTOR MATERIAL

Eduard Folkmann and Erich Pammer, Munich, Germany, assignors to Siemens Aktiengesellschaft, a corporation of Germany Filed Sept. 13, 1965, Ser. No. 486,742
Claims priority, application Germany, Sept. 14, 1964, S 93,142
7 Claims. (Cl. 148—175)

Epitaxy is frequently being used in the production of semiconductor components. The method consists in heating disc-shaped semiconductor crystals, often called a substrate, to a high temperature, below the melting point of the semiconductor, and bringing a reaction gas, which is preferably diluted for depositing the semiconductor into contact with the hot substrates.

A strip-shaped carrier which consists of electrically conductive material having thermic as well as chemical resistance and consisting, for example, of carbon or grahpite, has been provided as a heating source, upon which the semiconductor discs are being placed. During the depositing process, an electric current is passed through the carrier. The intensity of the current is adjusted so that the semiconductor crystals, which are in immediate contact with the carrier, are thus heated to a temperature high enough for the desired depositing process. As a rule, the reaction gas used is a mixture of hydrogen and a volatile halogenide of the semiconductor. In case of germanium epitaxy for example, the compounds are $GeCl_4$, $GeCl_2$, $GeHCl_3$, or the corresponding bromine or iodine compounds. Epitaxy is used not only for germanium, but also for silicon, silicon carbide and $A_{III}B_V$ compounds.

In order to better utilize the reaction gas it is suggested to let the latter flow essentially vertically through the depositing apparatus. See for example patent such as No. 3,131,098. Surprisingly, the epitactic layers become more even with vertically flowing reaction gas. These advantages are fully utilized in the method of the invention.

Our invention relates to a method of epitactically depositing semiconductor material from a gaseous phase upon monocrystalline semiconductor discs, which are heated to a temperature required for depositing the semiconductor from a reaction gas on the surface of the semiconductor discs. The heating is effected by means of direct contacting of a strip-shaped carrier, electrically heated to a high temperature and comprising an electrically conducting material which has thermal and chemical resistance. According to the invention, the semiconductor discs which are to be used as a substrate are held on the sloping sides of a gable-shaped carrier by protrusions and/or depressions of the carrier. During the depositing operation, the carrier is heated more strongly on the bottom than on top.

According to these embodiments, the carrier receives the form shown in the figures in which.

Figure 1:
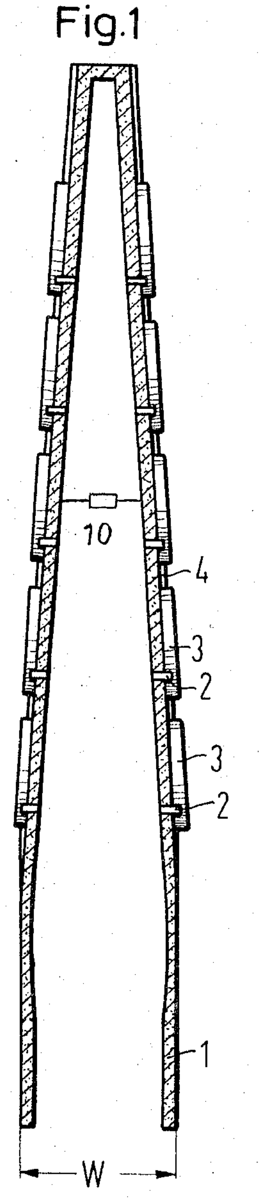
FIG. 1 shows a vertical cross section of a carrier with substrates according to the invention.

If necessary, the carrier may be folded several times, so that its shape is, for example, similar to the letter M. The carrier 1 as shown in the drawing consists, for example, of graphite or carbon and is provided with protrusions 2, preferably of the same material, for holding the discs 3. It is essential that the substrate completely contact the planar side of the carrier 1. In this manner, a satisfactory heat contact between the substrate discs 3 and the carrier 1 is ensured.

The cross section of the carrier increases from the bottom up so that heating becomes weaker on top than on the bottom. In addition to or in lieu thereof, the carrier may be heated by shunt means 10 which should preferably connect two points of the same height of both carrier legs. Care should be taken, thereby, that the temperature, which is controlled by a pyrometer, should be approximately 20–40° C. higher at the lower end of an approximately 200 mm. high carrier than at its upper end. A difference of 30° is preferred. In the case of germanium, the suggested average value to be adjusted for carrier temperatures should lie between 800 and 900°, for silicon it should amount to 1100–1300°, and for silicon carbide between 1600 and 1800 ° C., for boron between 1500 and 1800°.

Illustratory measurements are as follows:

Height L of the carrier is about 200 mm., leg width W is about 30 mm. and the width B is about 30 mm. The width of the gable crest should, preferably, be 5–10 mm. The cross-sectional area of the carrier at its lower end is about 60 $mm.^2$, whereas at the upper end the area is about 75 $mm^2$. The cross section is determined by the thickness of the carrier.

Figure 2:
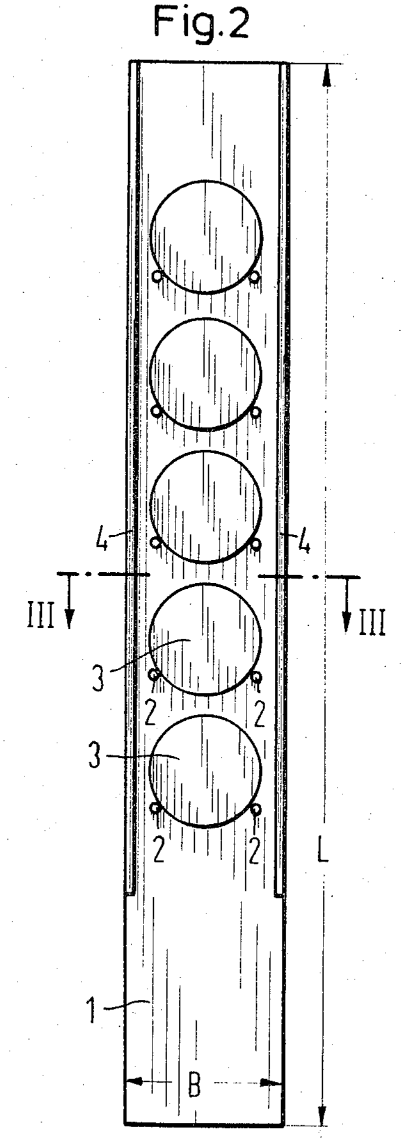
FIG. 2 shows a side view of FIG. 1.
Figure 3:
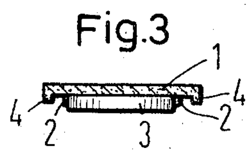
FIG. 3 shows a section along III—III of FIG. 2.

We further improve the quality and uniformity of the obtained layers by using a gable-shaped carrier whose width B is somewhat larger than the diameter of the intended semiconductor discs 3 and if the carrier is slightly depressed in the center so that the discs come to be positioned at the base of a flat longitudinal groove of the carrier. The groove need not be deeper than 1–2 mm. This groove is very plainly shown in FIG. 3, which also shows a cross section through the illustrated carrier which is shown in a front and side view in FIGS. 1 and 2. The groove is flanked on both sides by a flat incline 4.

Figure 4:
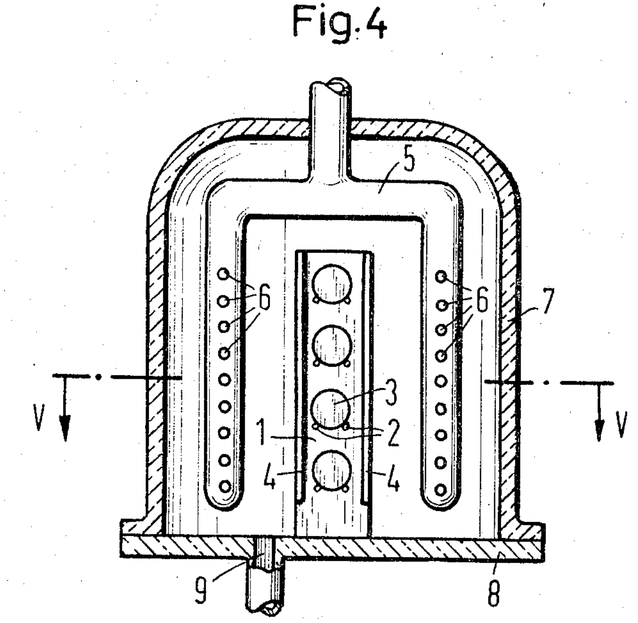
FIG. 4 shows epitaxial apparatus incorporating the carrier of FIG. 1.
Figure 5:
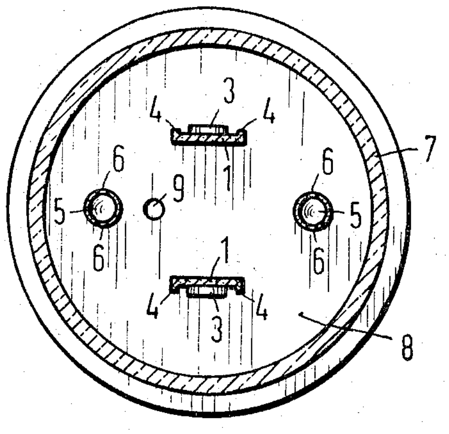
FIG. 5 shows a section along V—V of FIG. 4.

In the method according to the invention, the reaction gas is preferably supplied to the depositing vessel in the manner shown in FIGS. 4 and 5. The carrier 1, which is provided with the semiconductor discs or substrates 3 is heated by a current source (not shown) which is to be connected with the legs of the carrier. The current source is to be placed outside of the reaction vessel. The carrier is mounted with the crest upward in a bell-shaped reaction vessel 7 consisting, for example, of quartz and rests upon the bottom plate 8, through which the reaction gas leaves the reaction vessel at point 9. The feeding of the reaction gas takes place through a tube-like manifold 5, which also consists of quartz as is provided in both branches with outlets 6 for the fresh reaction gas. These outlets 6 are arranged exactly facing each other in such a way that the reaction gas flows into the reaction space in a horizontal and essentially tangential manner relative to the wall of the reaction vessel. The reaction gas is thus supplied in a particularly even way to the carrier 1 and the substrates which are attached to its outer side. Carrier 1, as shown in FIGS. 4 and 5, is positioned approximately in the center of the reaction space and between the two branches of the supply manifold 5 in a way whereby the connecting bridge of the manifold is perpendicular to the connecting straight branches thereof.

We claim:

1. In the method for epitaxially depositing semiconductor material from a gaseous phase upon a monocrystalline semiconductor substrate which is heated to a temperature required, for depositing the semiconductor from a reaction gas on the surface of said semiconductor substrate, by direct contact of said semiconductor substrate with an electrical conductive strip-shaped carrier, the improvement which comprises maintaining the semiconductor substrates at the sloping sides of a carrier, folded to gable-shape by holding means integral with said carrier and during the depositing process heating the carrier to a higher temperature at the bottom than at the top.

2. The method of claim 1, wherein the temperature difference between the upper and the lower end of the carrier is from 20–40° C.

3. The method of claim 2, wherein the temperature is 30° C.

4. Apparatus for epitaxial deposition of semiconductor material from a gaseous phase, which comprises a processing vessel with inlet and outlet means for passing a gaseous mixture containing a compound of the semiconductor substance to be precipitated, a gable-shapel supporting body vertically mounted within the processing vessel, holding means on said support for holding semiconductor substrates in place on said supporting body, said holding means being located within a groove on said supporting body.

5. The apparatus of claim 4, said inlet means consisting of a manifold with two downwardly extending branches, said branches provided with two rows of openings for feeding reaction gas tangentially to the walls of the reaction vessel.

6. The apparatus of claim 5, wherein the supporting body is of variable cross section whereby heating of said supporting body is controlled, said supporting body being situated within the reaction vessel between the two downwardly extending branches of the manifold.

7. The apparatus of claim 5, wherein the shunt means is used to control the heating of said supporting body.

References Cited

UNITED STATES PATENTS

| | | | |
|---|---|---|---|
| 3,125,533 | 3/1964 | Allegretti et al. | 252—62.3 |
| 3,226,254 | 12/1965 | Reuschel | 117—106 |
| 3,271,208 | 9/1966 | Allegretti | 148—175 |
| 3,296,040 | 1/1967 | Wigton | 148—175 |

DAVID L. RECK, *Primary Examiner.*

N. F. MARKVA, *Assistant Examiner.*